(12) United States Patent
Sun

(10) Patent No.: US 6,386,920 B1
(45) Date of Patent: May 14, 2002

(54) JOINT SOCKET DEVICE FOR MEMORY CARDS

(75) Inventor: Chun-I Sun, Taipei (TW)

(73) Assignee: Kinpo Electronics, Inc. (TW)

( * ) Notice: Subject to any disclaimer, the term of this patent is extended or adjusted under 35 U.S.C. 154(b) by 0 days.

(21) Appl. No.: 09/988,530

(22) Filed: Nov. 20, 2001

(30) Foreign Application Priority Data

Nov. 27, 2000 (TW) ........................... 90215711 U (51) Int. Cl.[7] .................................................. H01R 3/00
(52) U.S. Cl. ........................ 439/630; 439/696; 439/687; 439/906; 439/945; 361/737
(58) Field of Search ................. 439/630, 632, 439/906, 996, 687, 945; 361/735, 737

(56) References Cited

U.S. PATENT DOCUMENTS 5,228,874 A * 7/1993 Lin ............................ 439/687
5,752,857 A * 5/1998 Knights ....................... 439/638
6,097,605 A * 8/2000 Klatt et al. .................. 361/737
6,250,965 B1 * 6/2001 Neifer ........................ 439/630

* cited by examiner

Primary Examiner—Tho D. Ta
Assistant Examiner—Truc Nguyen
(74) Attorney, Agent, or Firm—Troxell Law Office PLLC (57) ABSTRACT

A joint socket device for memory cards provides a common lower base with an upper covering to offer a common space for receiving a smart media card (SMC), a multimedia card (MMC), a secure digital memory card (SD) and a memory stick (MS). The joint socket device is available for being inserted with four different memory cards without a need of offering four different socket devices so as to save contact points thereof, reduce the size occupied thereof, and facilitate the use thereof, respectively.

17 Claims, 9 Drawing Sheets

JOINT SOCKET DEVICE FOR MEMORY CARDS

BACKGROUND OF THE INVENTION

1. Field of the Invention:

The present invention relates to a joint socket device for memory cards, and particularly to a socket device, which is possible for being inserted with a smart media card (SMC), a multimedia card (MMC), a secure digital memory card (SD) and a memory stick (MS) respectively.

2. Description of Related Art:

Usually, a portable personal apparatus such as a digital camera or a notebook computer is provided with a memory card for storing data. It is necessary to arrange a socket device to receive the memory card of the portable personal apparatus. The socket device provides a conduction part to connect with the memory card and a microprocessor in the portable personal apparatus. Referring to FIG. 1, a SMC 10 is a large card with a small thickness, a MMC 20 is smaller and thicker, a SD 30 has the same area as the MMC 20 but much thicker, and the MS 40 has the smallest width and the largest length with a largest thickness. Each of the four memory cards at a facial side thereof is barely attached with different numbers of connection pieces 101, 201, 301, 401. The connection pieces are passages for the memories in the memory cards in conjunction with foreign parts. Each of the connection pieces 101 of the SMC 10 has almost the same width as that of the respective connection piece 201 of the MMC 20 and a clearance between two neighboring connection pieces 101 is almost the same as that between two neighboring connection pieces 201. The SD 30 has the connection pieces 301 thereof in a recess and a clearance between two adjacent ones for the 7 pieces at the middle section thereof is the same as that between two neighboring connection pieces 201 thereof. The connection pieces 401 of the MS 40 are also in a recess and provide a narrowest clearance between two adjacent ones thereof. All the four memory cards have a cut corner 102, 202, 302, 402 respectively, the SD 30 further has a write protect switch 303, and the MS 40 further has an anti-reversed insertion groove 403. Because SMC 10, MMC 20, SD 30 and MS 40 provide a shape, size and the number of junctions thereof different from one another, the socket devices adapted to the preceding memory cards are different from one another in their configurations and in the number of conduction parts thereof. The conventional socket device is only made for one of the preceding memory cards and not for all kinds of memory cards so that it is inconvenient that more socket devices have to be offered in case of multiple types memory cards being used. In this way, more joints have to be arranged in the circuit of each conventional socket device and a large space has to be offered for the multiple socket devices too.

SUMMARY OF THE INVENTION

An object of the present invention is to provide a joint socket device for memory cards, which is adapted to different types of memory cards to enhance the convenience while in use.

Another object of the present invention is to provide a joint socket device for memory cards, which offers less connection points and a less gross size thereof than the conventional ones having the identical functions.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
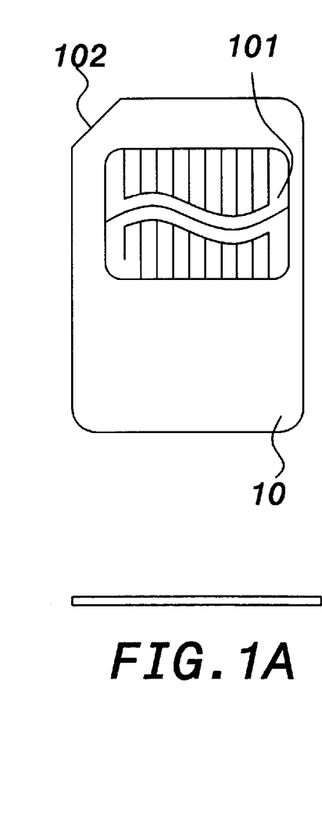
FIG. 1A, 1B, 1C, 1D are plan views of a smart media card (SMC), a multimedia card (MMC), a security digital memory card (SD), and a memory stick (MS) illustrating the appearance with thickness thereof respectively.
Figure 1B:
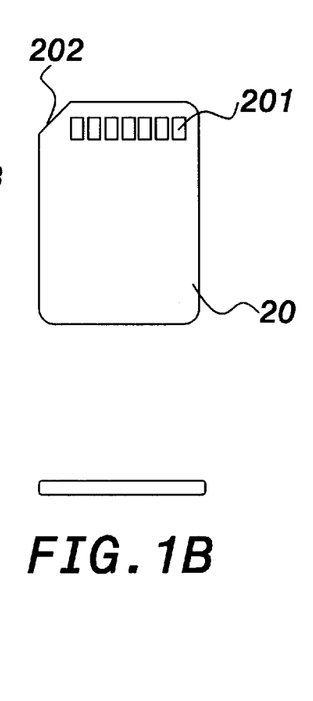
Figure 1C:
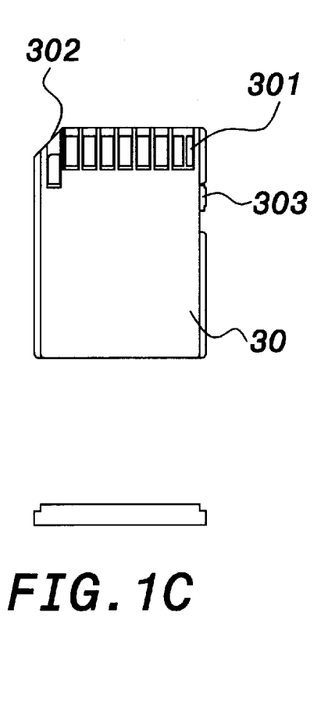
Figure 1D:
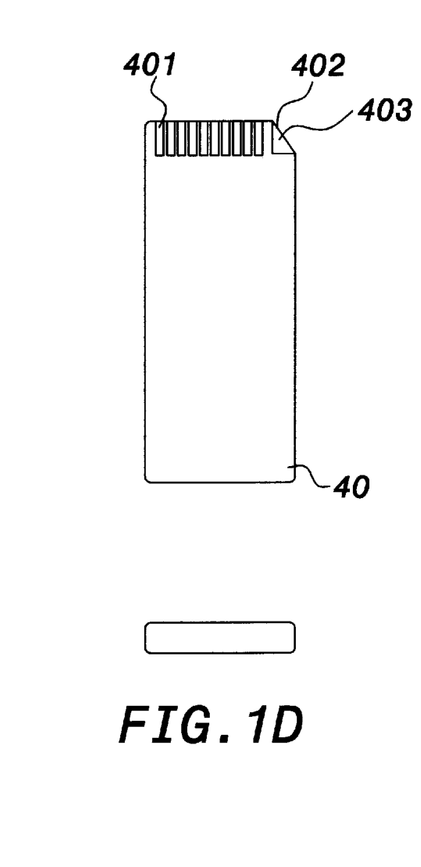
Figure 2:
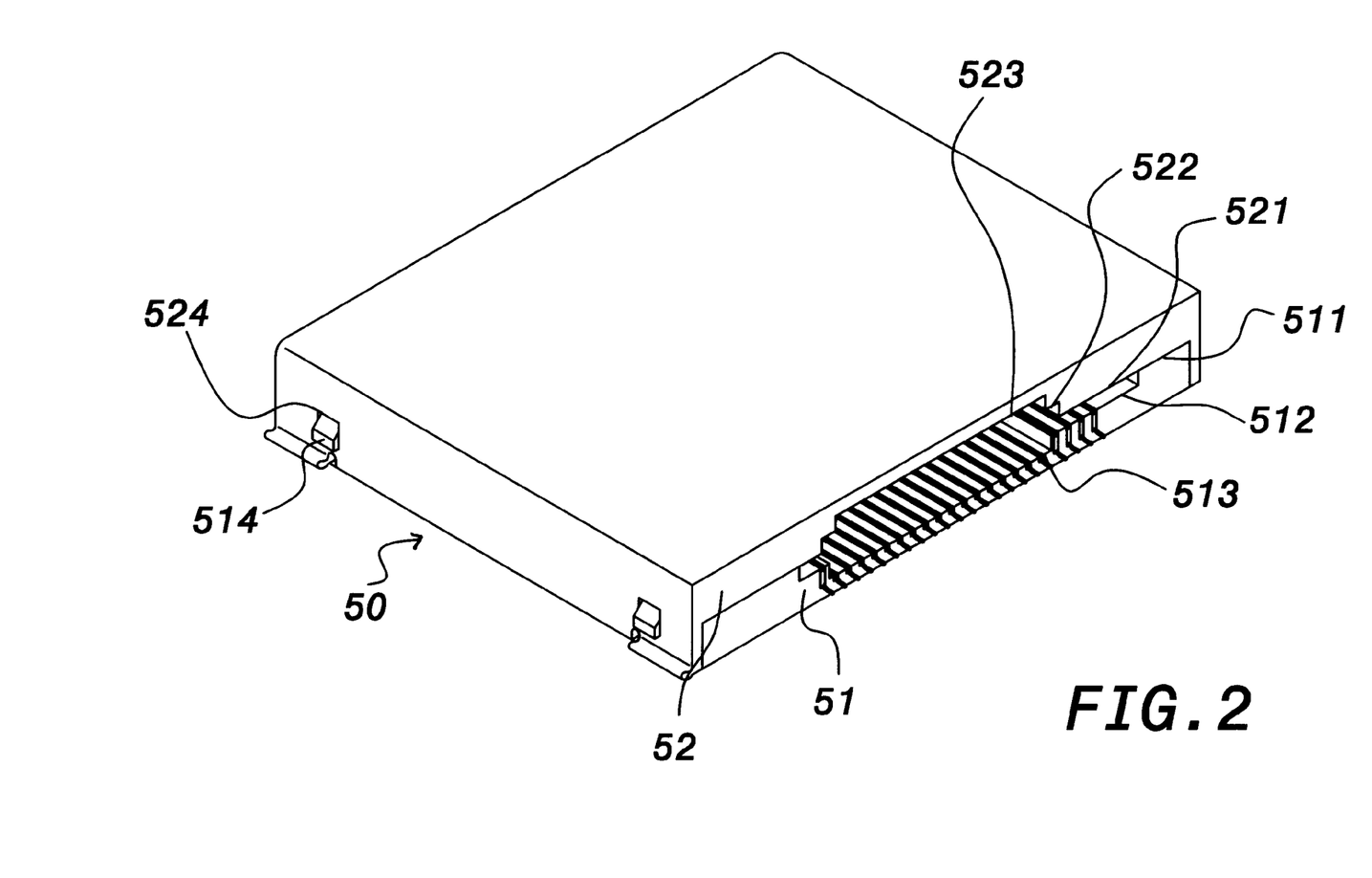
FIG. 2 is a perspective view of a joint socket device for memory cards according to the present invention in a first embodiment thereof.
Figure 3:
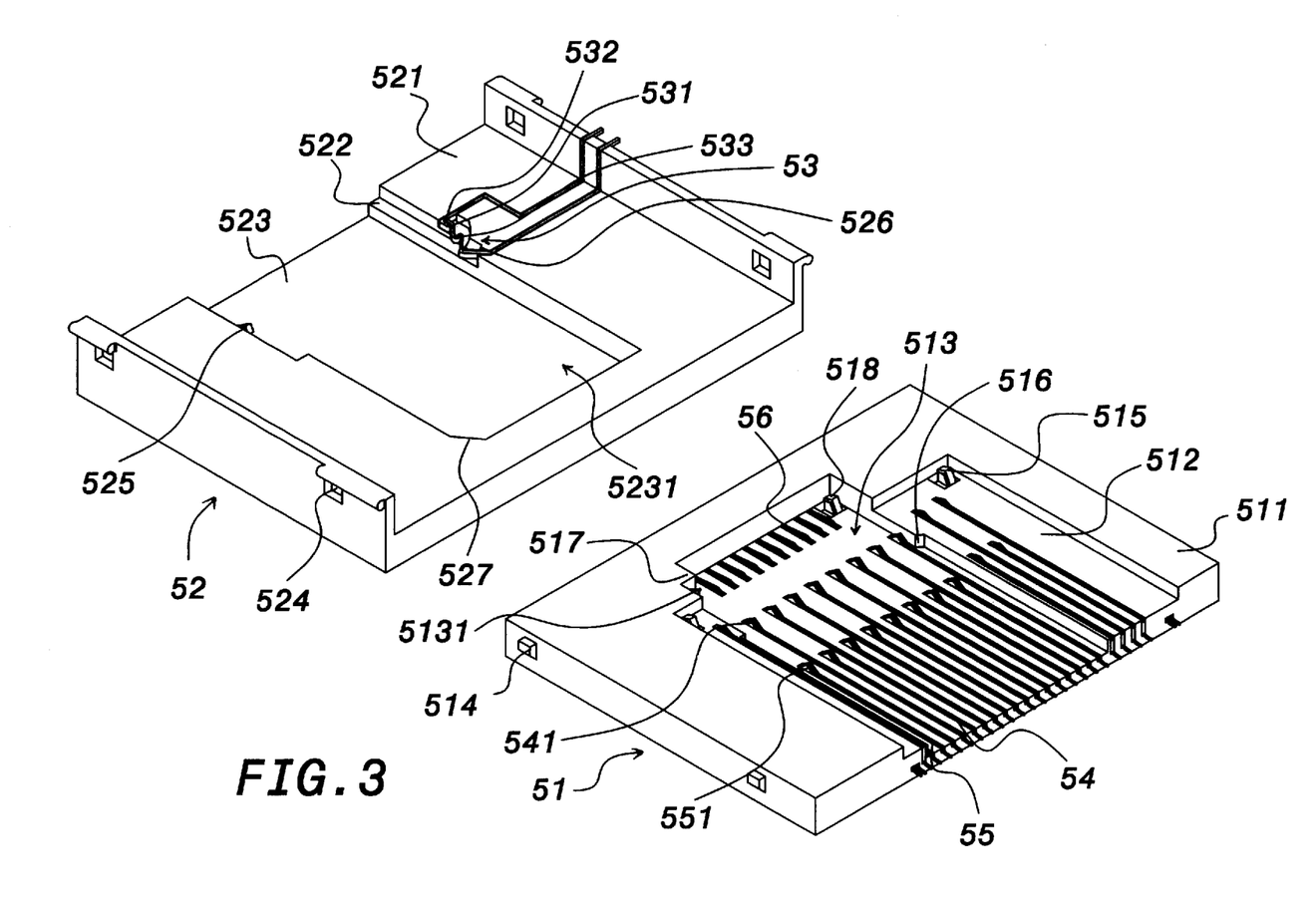
FIG. 3 is a perspective view illustrating a lower base and an upper covering of the joint socket device for memory cards shown in FIG. 1.

Referring to FIGS. 2 and 3, a first embodiment of the present invention provides a joint socket device 50 for memory cards, which comprises a lower base 51 and an upper covering 52. The lower base 51 provides a top face 511, a first recess part 512 and a second recess part 513, and the second recess part 513 is deeper than the first recess part 512. The first recess part 512 has a sensor switch 515 for identifying different smart media cards (SMCs) by way of distinguishing the position of the cut corner on the respective SMC while the SMCs are inserted into the common socket device 50. The second recess part 513 at a lateral side thereof has a slant corner 516 corresponding to the cut corner of the MMC and the SD, and at a narrow area 5131 thereof has a jut stop 517 corresponding to an anti-reversed insertion groove of the MS to prevent the MS from being inserted into the joint socket device 50 with the reversed side thereof. A sensor switch 518 is arranged at the rear end of the joint socket device 50 to detect whether the MS is inserted or not. The upper covering 52 has an inner face 521, a first high part 522 and a second high part 523, and the second high part 523 is higher than the first high part 522. The upper covering 52 at both lateral sides thereof has two engaging holes 524 respectively for engaging with two projection pieces 514 at both of the lateral sides respectively so that the upper covering 52 and the lower base 51 can be associated with each other with the inner face 521 being touched to the top face 511 of the lower base 51. Thus, part of the inner face 521 and the first recess part 512 constitute a first chamber for containing the SMC, the first high part 522 and the first recess part 512 constitute a second chamber for containing the MMC, and the first high part 522 and the second recess part 513 constitute a third chamber for containing the SD. The narrow area 5231 of the second high part 523 and the rest area of the same part and the narrow area 5131 of the second recess part 513 and the rest area of the same part form a fourth chamber receiving the MS. The first high part 522 has a sensor switch 525 corresponding to a write protect of the SD and a lateral side opposite to the sensor switch 525 has a slant corner 526 corresponding to the slant corner 516 and the slant corner 526 is provided with a sensor switch 53 for the MMC and the SD. The sensor switch 53 comprises a first spring plate 531 and a second spring plate 532 with a respective end thereof touching to each other. The first spring plate 531 has a protrusion 533 extending outward through the slant corner 526 of the first high part 522 so that the slant corner 526 is pressed down by the MMC or the SD to retreat inward such that the first spring plate 531 is in state of separating from the second spring plate 532 as soon as the MMC or the SD is inserted into the first high part 522. Thus, it can be learned if the MMC or the SD has been inserted into the joint socket device 50. The narrow area 5231 of the second high part 523 provides a slant corner 527 corresponding to the cut corner of the MS. The joint socket device for a memory card according to the present invention at either the lower base or the upper covering thereof is required to provide a conduction part so as to correspond to connection plates on the SMC, the MMC, the SD and MS. The conduction part illustrated in the first embodiment of the present invention comprises a plurality of long connecting pins 54, short connecting pins 55 and MS connecting pins 56 disposed at the lower base 51. Then, the conduction part, i.e., all the connecting pins illustrated in the first embodiment of the present invention, can contact with the connection plate as soon as the SMC, the MMC, the SD, or the MS is inserted into the joint socket device. Hence, the memory card can connect with the circuit on a circuit substrate in a personal mobile device to perform an operation of read or write.

There are two adjacent short connecting pins, which are among the long and the short connecting pins 54, 55 located at the second recess part 513, extend rearward in an ascending way from the front end of the socket device, and a respective contact point at the other ends of the two short connecting pins is a little higher than the bottom of the first recess part 512 so as to touch the connection plate of the SMC, MMC or SD. When the MS is inserted into the socket device, the long connecting pins 54 and the short connecting pins 55 are pressed down to enter the pin grooves in the second recess part 513 without interfering the MS. The MS connecting pins 56 is disposed at the rear end of second recess part 513 for touching the connection plate of the MS. Each MS connection pin 56 can join an individual long connecting pin 54 or an individual short connecting pin 55 to use the output end jointly.

Figure 4:
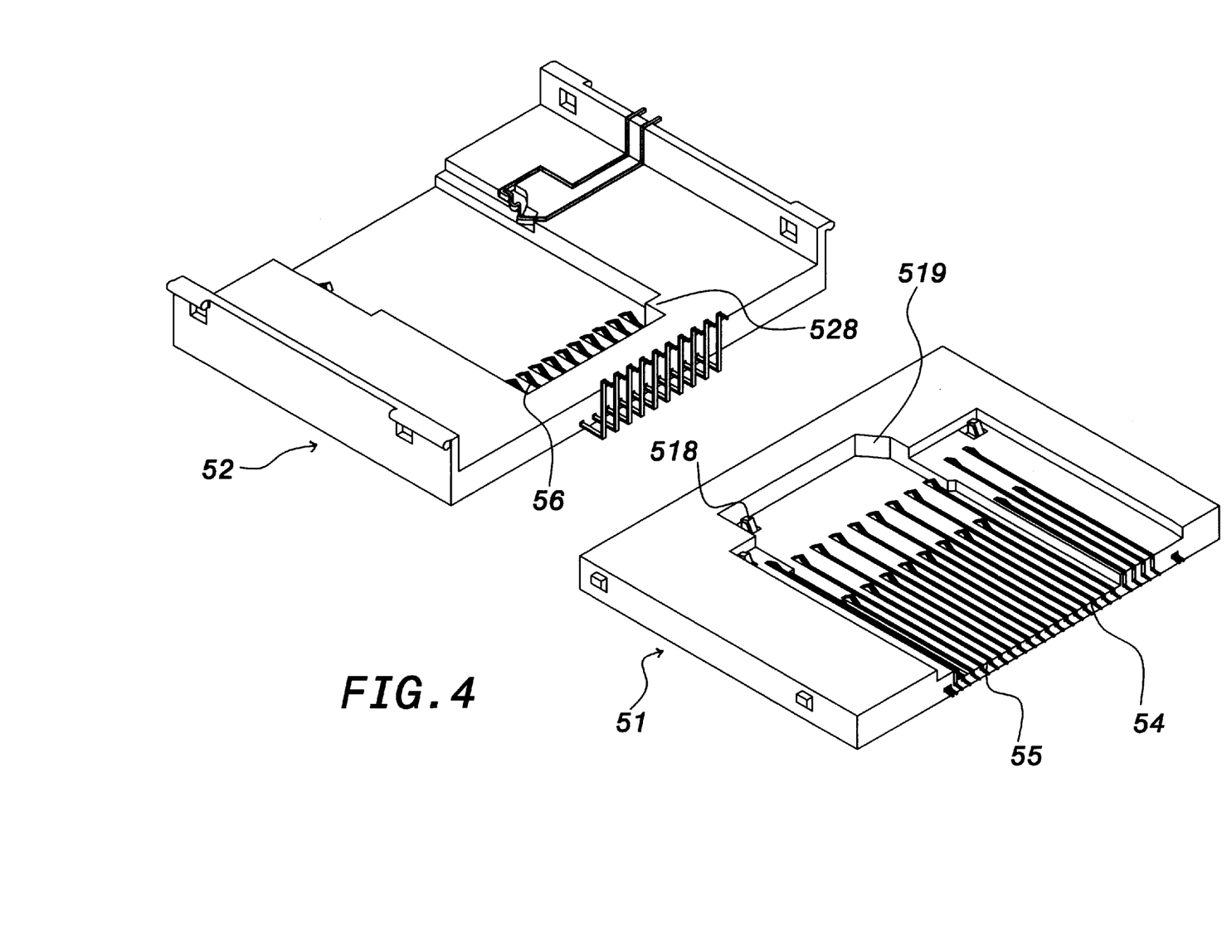
FIG. 4 is a perspective view illustrating a lower base and an upper covering of the present invention in a second embodiment thereof.

Referring to FIG. 4, the difference of a second embodiment of the present invention from the joint socket device is in that the MS connecting pins 56 and the jut stop 528 corresponding to the anti-reversed groove are located at the rear end of the second high part on the upper covering 52. The second recess part of the lower base 51 has a slant corner 519 corresponding to the MS cut corner and the sensor switch 518 is disposed at another side opposite to the slant corner 519. At this time, the connection plate of the MS faces the upper covering 52 to contact the MS pins 56.

Figure 5:
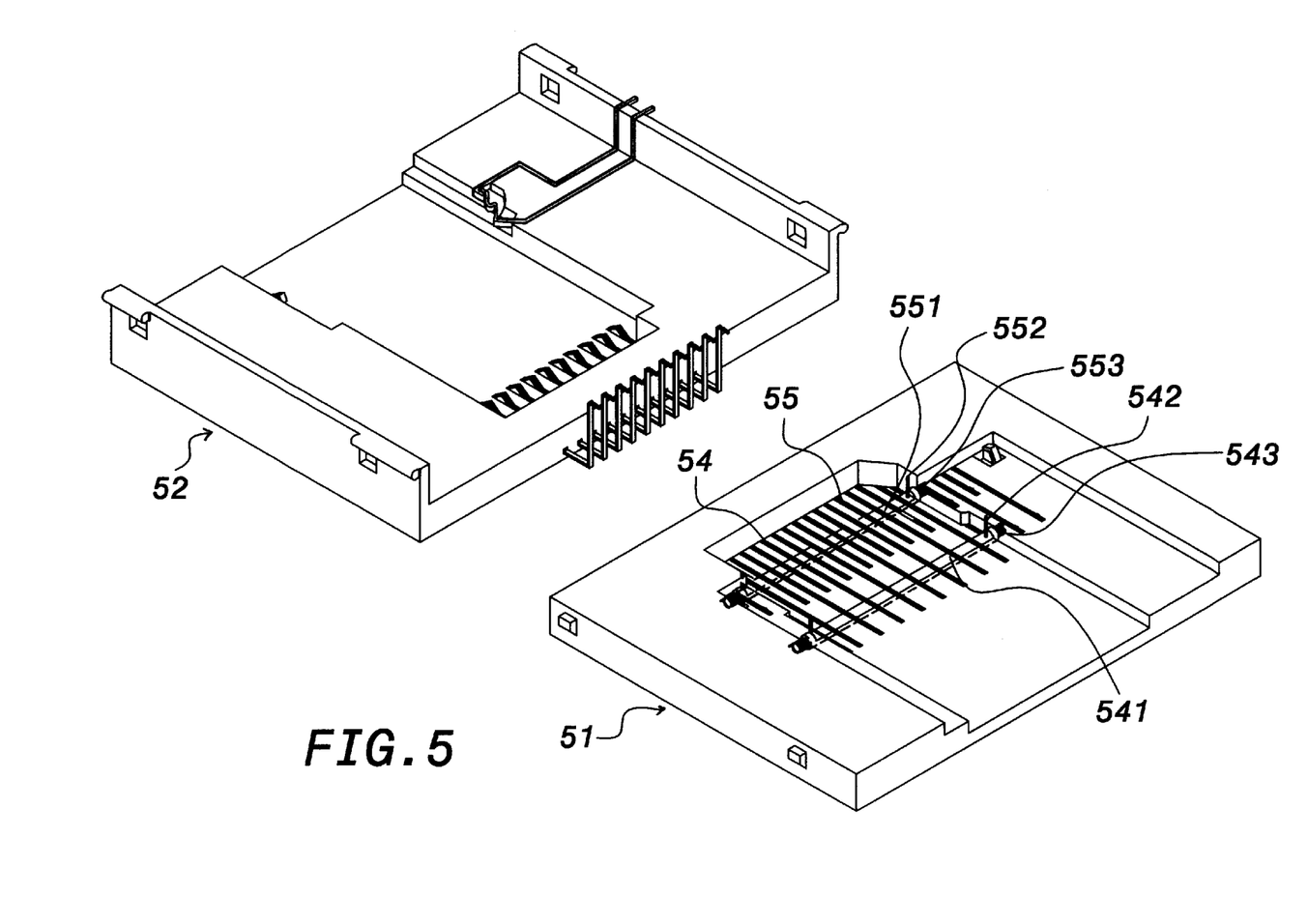
FIG. 5 is perspective view illustrating a lower base and an upper covering of the present invention in a third embodiment thereof.
Figure 6A:
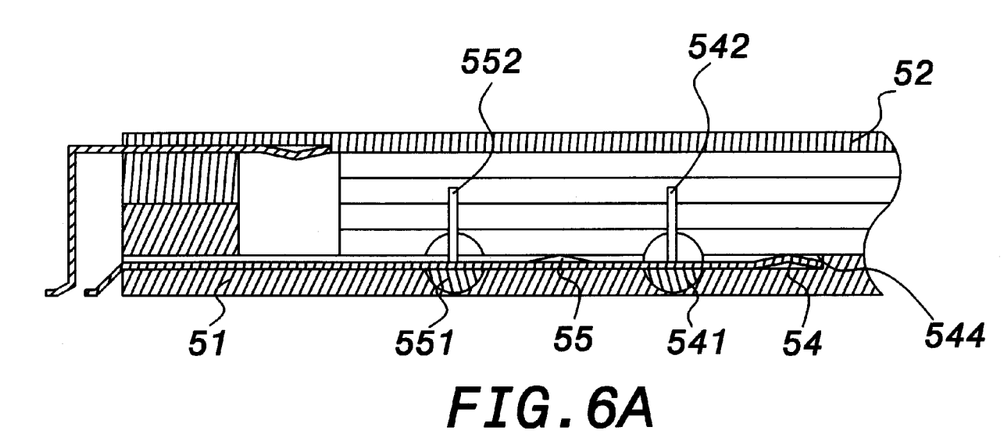
FIG. 6A is a fragmentary sectional view of the lower base in the third embodiment shown in FIG. 5.
Figure 6B:
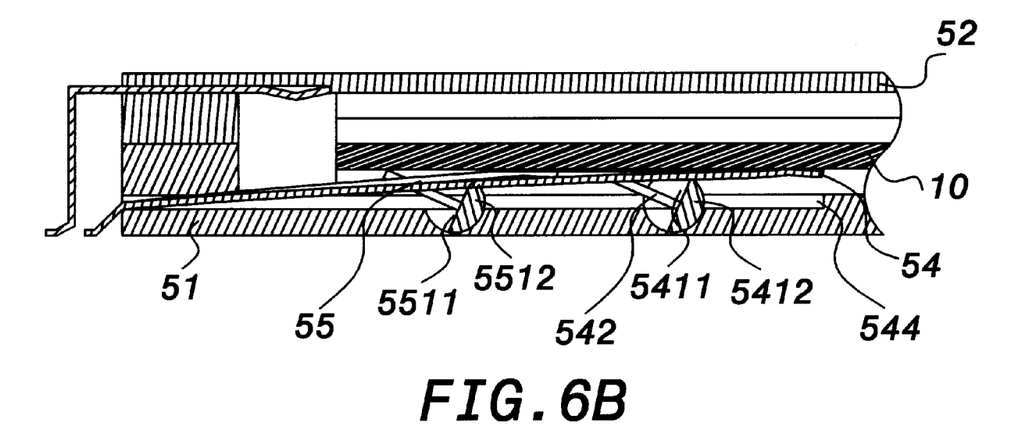
FIG. 6B is another fragmentary sectional view of the lower base in the third embodiment shown in FIG. 5.

Referring to FIGS. 5, 6A, and 6B, a third embodiment of the present invention is illustrated to provide a joint socket device. The difference of the joint socket device of present embodiment from the joint socket device illustrated in FIG. 4 is in that the second high part 523 of the upper covering 52 has the sensor switch at the rear end thereof to detect if the MS is inserted into the joint socket device or not, and the long and the short connecting pins 54, 55 extend forward to the front end from the rear end of the lower base 51 with two adjacent long connecting pins among the connecting pins. In order to prevent the connecting pins from blocking the thicker MS as soon as the thicker MS is inserted into the chamber, a lifted rod is arranged at the second recess part 513 under the connecting pins to keep the connecting pins in pin slots before the SMC, the MMC, or the SD being inserted into the joint socket device. When the lifted rod is touched by the SMC, the MMC, or the SD during the SMC, the MMC, or the SD being inserted into the joint socket device, the lifted rod urges the connecting pins to move out from the pin slots and contact with the connection pieces of the SMC, the MMC, or the SD. The present embodiment illustrates that a first lifted rod 541 is pivotally connected under the long connecting pins 54 at the second recess part 513 and a second lifted rod 551 is pivotally connected under the short connecting pins 55. The first lifted rod 541 and the second lifted rod 551 at both ends thereof provide a press lever 542, 552 respectively in conjunction with a torsion spring 543, 553. The first lifted rod 541 has a longitudinal flat cut surface 5411 and the long connection pins 54 are laid on the cut surface 5411 and in the pin slots 544. As soon as the memory card such as a SMC 10 is inserted into the joint socket device, the bottom of the SMC 10 may touch the press lever 542 on the cut flat surface 5411 and the press lever 542 is inclined toward a lateral side with the lifted rod 541 rotating an angular distance. Because the cut flat surface 5411 rotates an angular distance too, the rod body 5412 can push the long connecting pins 54 upward to touch the connection pieces of the SMC 10. As soon as the SMC 10 is taken out from the joint socket device, the press lever 542 is free from the pressing force and restores to the original position with the longitudinal cut flat surface 5411 by way of the rebound force of the torsion spring 543. Hence, the long connecting pins 54 moves backward into the pin slots 544. Similarly, the second lifted rod 551 has an arrangement almost the same as the first lifted rod 541 and provides the same movement as the first lifted rod 541 does. But, the second lifted rod 551 at the rod body thereof has recesses accommodating the long connecting pins 54 so that the second lifted rod 551 is not possible to urge the long connecting pins 54 upward during turning an angular distance.

Figure 7:
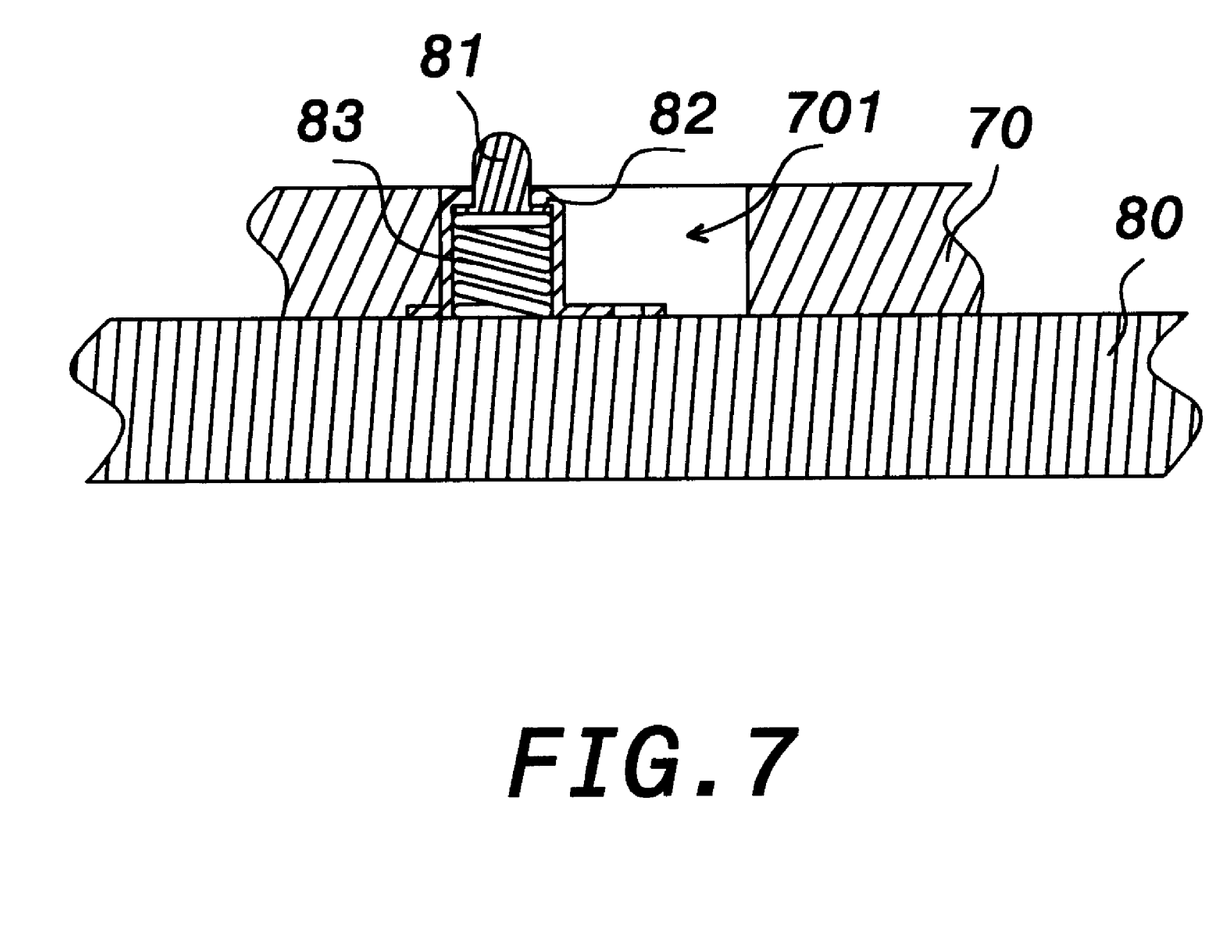
FIG. 7 is a sectional view illustrating an extendable connecting pin of the present invention.

The join socket device of the present invention is required to provide a conduction part such as the connecting pins in the preceding embodiments. As shown in FIG. 7, a further embodiment illustrates another conduction part in the joint socket device of the present invention. The joint socket device 70 provides an opening 701 corresponding to the connection pieces of the SMC, the MMC, the SD, or the MS, and an extendable connecting pin 81 is arranged to locate at the opening 701 so as to touch the connection pieces of the SMC, the MMC, the SD, or the MS such that the memory card can electrically connect with the circuit on the substrate 80. The extendable connecting pin 81 is received in a fixing seat 82 and is urged by a spring 83 and is moved inward the fixing seat 82 during being subjected by a downward force. The fixing seat 82 connects with the lead wires on the circuit substrate 80 for transmitting signals.

Figure 8:
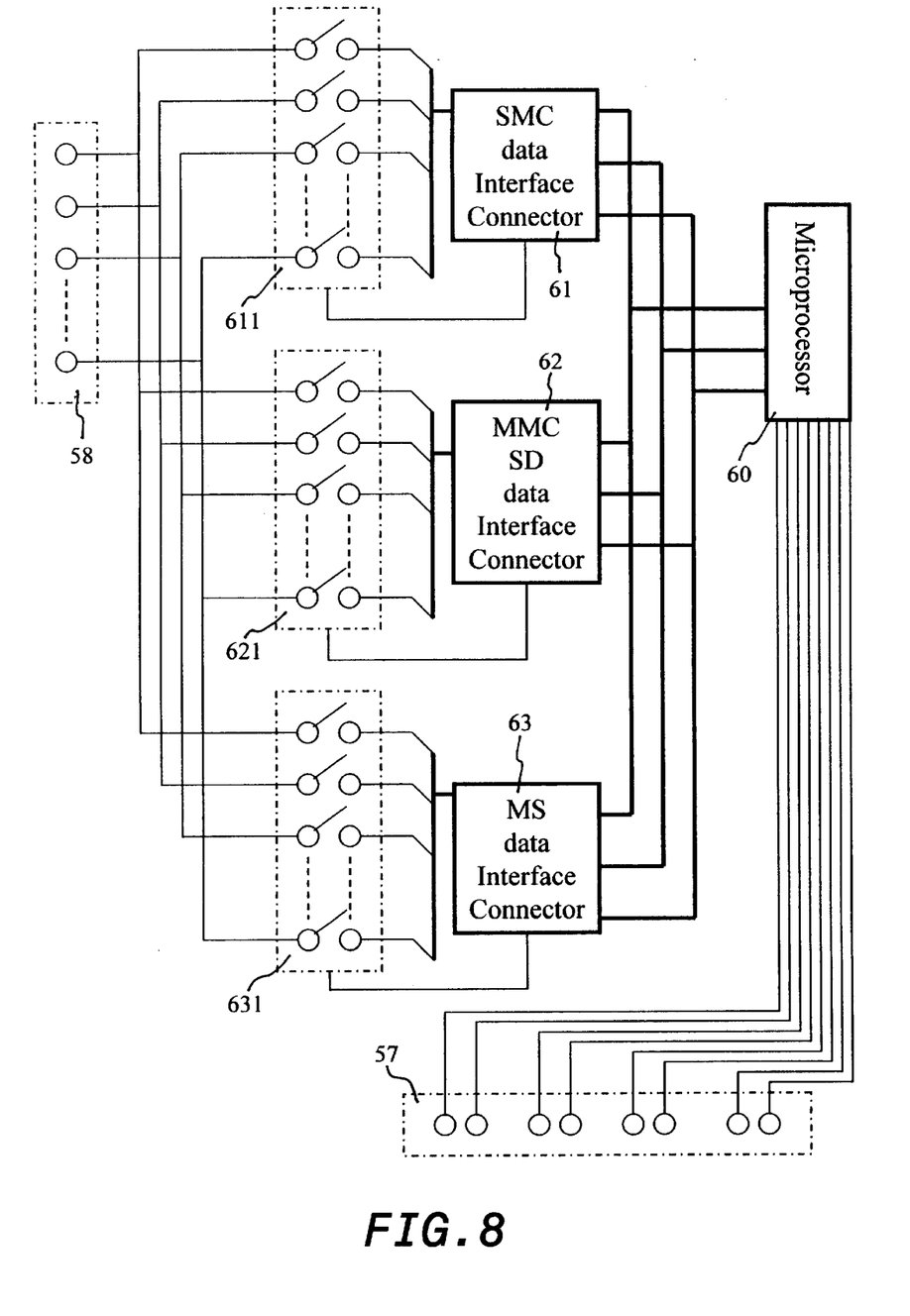
FIG. 8 is a block diagram for a circuit arranged in the present invention.

Referring to FIG. 8, a circuit in the joint socket device of the present invention is illustrated. The circuit comprises a microprocessor 60 connecting with four contact points 57 of the sensor switches, a SMC data interface connector 61, a MMC/SD data interface connector 62, and a MS data interface connector 63. The SMC data interface connector 61, the MMC/SD data interface connector 62, and the MS data interface connector 63 connect a switch 611, 621, 631 respectively. The three switches 611, 621, 631 at the other ends thereof connect with one another at a contact point 58 of the common socket device so as to connect with the conduction part in the joint socket device. When the SMC, the MMC, the SD or the MS is inserted into the joint socket device, the microprocessor 60 can detect the response signals of the four sensor switches and determine to connect with the conduction part of the joint socket device by way of the switch 611 of the SMC data interface connector 61, the switch 621 of the MMC/SD data interface connector 62 or the switch 631 of the MS data interface connector 63 such that the SMC, the MMC, the SD, or the MS can be connected to the microprocessor 60.

Figure 9:
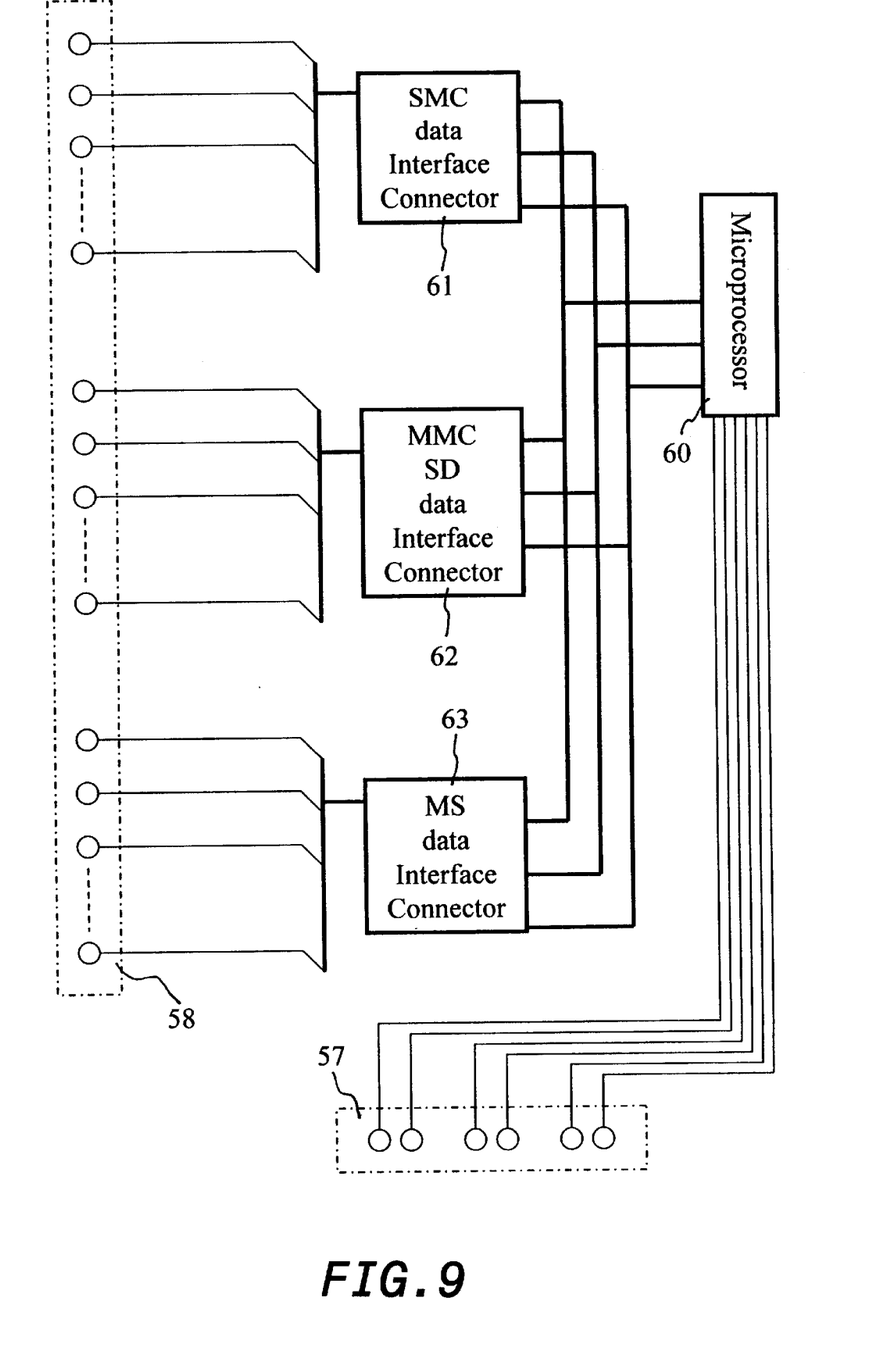
FIG. 9 is another block diagram for a circuit arranged in the present invention.

Referring to FIG. 9, another embodiment of the circuit in the present invention is illustrated. The circuit comprises a microprocessor 60 connecting with a SMC data interface connector 61, a MMC/SD data interface connector 62 and a MS data interface connector 63, and contact points 57 for the sensor switches on the joint socket device. The SMC data interface connector 61, the MMC/SD data interface connector 62 and the MS data interface connector 63 are connected to contact points 58 on the joint socket device so as to connect with the conduction parts on the lower base and the upper covering. When the SMC and or the MS is inserted into the joint socket device, the microprocessor 60 can detect the response signals of the sensor switches such that the SMC or the MS can be read or can read directly to check if the MMC/SD is inserted or not, and can determine to read or write the data in the SMC, the MMC, the SD or the MS by way of the SMC data interface connector 61, the MMC/SD data interface connector 62 or the MS data interface connector 63.

It can be understood that it is required 56 contact points totally while a respective conventional socket device is inserted with the SMC, the MMC, the SD and MS uniquely. It is appreciated that the present invention provides a joint socket device for the SMC, the MMC, the SD and MS and it is possible to reduce to 34 contact points at most so as to achieve a purpose of saving contact points. Furthermore, the present invention provides a common receiving space for the SMC, the MMC, the SD and MS to save the gross volume required by these four socket devices independently. Accordingly, it is convenient that the SMC, the MMC, the SD and MS can be operated in a joint socket device and it is possible to save the production cost resulting from three extra conventional socket devices.

While the invention has been described with reference to preferred embodiments thereof, it is to be understood that modifications or variations may be easily made without departing from the spirit of this invention, which is defined by the appended claims.

What is claimed is:

1. A joint socket device for memory cards, comprising:
   a lower base with a top face, providing a first recess part and a second recess part, and the second recess part having a narrow area; and
   an upper covering with a recess face, providing a first high part and a second high part, being joined to the lower base so as to form a first chamber, a second chamber, a third chamber and a fourth chamber, and a common part being included in the first chamber, the second chamber, the third chamber and the fourth chamber respectively;
   wherein, a conduction part is arranged on the lower base to join a plurality of connection pieces provided on each of the memory cards and a plurality of sensor switches are provided on the lower base for detecting each of the memory cards.

2. The joint socket device for memory cards according to claim 1, wherein said upper covering provides a conduction part to join a plurality of connection pieces provided on each of the memory cards and provides a plurality of sensor switches for detecting each of the memory cards.

3. The joint socket device for memory cards according to claim 1, wherein the conduction part provides a plurality of openings for a plurality of extendable connecting pins moving out and contacting with the connection pieces of the respective memory card.

4. The joint socket device for memory cards according to claim 1, wherein the second recess part is deeper than the first recess part, and second high part is higher than the first high part.

5. The joint socket device for memory cards according to claim 1, wherein said upper covering provides a conduction part for connecting with the connection pieces on each of the memory cards and provides a plurality of sensor switches for detecting each of the memory cards.

6. The joint socket device for memory cards according to claim 2, wherein said conduction part is composed of a plurality of connecting pins.

7. The joint socket device for memory cards according to claim 2, wherein said sensor switches include a write protect switch.

8. The joint socket device for memory cards according to claim 2, wherein one of the sensor switches comprises two spring plates with a respective end thereof contacting with each other with the first spring plate having a projection extending outward the upper covering through a lateral side of the first high part.

9. The joint socket device for memory cards according to claim 2, wherein the second recess part is deeper than the first recess part, and the second high part is higher than first high part.

10. A circuit in a joint socket device for memory cards, comprising:
    a microprocessor;
    a plurality of sensor switches as defined in claim 2, each of the sensor switches having a junction connecting with the microprocessor;
    a SMC data interface connector with two ends, one of the ends connecting with the microprocessor and the other end thereof connecting with a first switch;
    a MMC/SD data interface with two ends, one of the ends connecting with the microprocessor and the other end thereof connecting with a second switch;
    a MS data interface connector with two ends, one of the ends connecting with the microprocessor and the other end thereof connecting with a third switch;
    a common junction, connecting with the first, the second and the third switches respectively; and
    a conduction part, connecting with the common junction; whereby, as soon as a smart media card (SMC), a multimedia: card (MC), secure digital memory card (SD), or a memory stick (MS) is inserted into the joint socket device, the microprocessor can detect response signals from the sensor switches to determine a connection with the conduction part by way of the SMC data interface connector, the MMC/SD data interface connector or the MS data interface connector such that the SMC, the MMC/SD or the MS can be treated by the microprocessor.

11. A circuit in a joint socket device for memory cards, comprising:
    a microprocessor; p1 a plurality of sensor switches as defined in claim 2, each of the sensor switches having a junction connecting with the microprocessor;

a SMC data interface connector with two ends, one of the ends connecting with the microprocessor;

a MMC/SD data interface with two ends, one of the ends connecting with the microprocessor;

a MS data interface connector with two ends, one of the ends connecting with the microprocessor;

a common junction, connecting with the other ends of the SMC data interface connector, the MMC/SD data interface and the MS data interface connector, respectively; and a conduction part, being disposed on a lower base and an upper covering of the common socket device respectively, and connecting with the common junction;

whereby, as soon as a smart media card (SMC), a multimedia card (MC), secure digital memory card (SD), or a memory stick (MS) is inserted into the common socket device, the microprocessor can detect response signals from the sensor switches to determine a connection with the conduction part by way of the SMC data interface connector, the MMC/SD data interface connector or the MS data interface connector such that the SMC, the MMC/SD or the MS can be treated by the microprocessor.

12. The joint socket device for memory cards according to claim 6, wherein said connecting pins includes a plurality of short connecting pins and a plurality of long connecting pins with an arrangement of two of the short connecting pins being adjacent to each other and the rest ones of the short connecting pins and all the long connecting pins being alternately disposed; and the connecting pins extend rearward from a front end of the lower base and part of the connecting pins being in the second recess part to extend rearward in an ascending way with a respective touch end thereof a little higher than a bottom of the first recess part for contacting with the respective memory card.

13. The joint socket device for memory cards according to claim 6, wherein said connecting pins include a plurality of short connecting pins and a plurality of long connecting pins with an arrangement of two of the long connecting pins being adjacent to each other and the rest ones of the long connecting pins and all the short connecting pins being alternately disposed; said upper covering provides a conduction part for connecting with the connection pieces on each of the memory cards and provides a plurality of sensor switches for detecting each of the memory cards; the connecting pins extend forward from a rear end of the lower base, and a first lifted rod is pivotally connected at the second recess part under the long connecting pins and a second lifted rod is pivotally connected under the short connecting pins, and multiple ones of the connecting pins are disposed in the second high part of the upper covering with an end of the multiple ones extending outward from a rear end of the upper covering, and the second high part has a narrow area with slant corner at a rear end of the narrow area with another jut stop.

14. The joint socket device for memory cards according to claim 12, wherein a plurality of additional connecting pins extend from a rear end of the lower base to a rear end of the second recess part, and the narrow area of the second recess part has a slant corner with a jut stop.

15. The joint socket device for memory cards according to claim 12, wherein said upper covering provides a conduction part for connecting with the connection pieces on each of the memory cards and provides a plurality of sensor switches for detecting each of the memory cards; and a plurality of further connecting pins are disposed in the second high part of the upper covering with an end of the another ones extending outward from a rear end of the upper covering, and the second high part has a narrow area with a slant corner at a rear end of the narrow area with another jut stop.

16. The joint socket device for memory cards according to claim 13, wherein said first and said second lifted rods at both ends thereof respectively have a press lever with a torsion spring and have a flat longitudinal cut surface respectively with the respective press lever being attached to the cut surface; and the second lifted rod provides a plurality of cut grooves corresponding the long connecting pins at spots touching the long connecting pins.

17. The joint socket device for memory cards according to claim 10, wherein said upper covering provides a conduction part for connecting with the connection pieces on each of the memory cards and provides a plurality of sensor switches for detecting each of the memory cards.

\* \* \* \* \*